(12) United States Patent
Wang et al.

(10) Patent No.: US 11,079,510 B2
(45) Date of Patent: Aug. 3, 2021

(54) SEISMIC WELL TIES USING BLOCKING SCHEMES

(71) Applicant: Landmark Graphics Corporation, Houston, TX (US)

(72) Inventors: Kainan Wang, Houston, TX (US); Jesse Lomask, Houston, TX (US); Felix Segovia, Katy, TX (US)

(73) Assignee: Landmark Graphics Corporation, Houston, TX (US)

( * ) Notice: Subject to any disclaimer, the term of this patent is extended or adjusted under 35 U.S.C. 154(b) by 496 days.

(21) Appl. No.: 16/063,834

(22) PCT Filed: Feb. 19, 2016

(86) PCT No.: PCT/US2016/018596
§ 371 (c)(1),
(2) Date: Jun. 19, 2018

(87) PCT Pub. No.: WO2017/142544
PCT Pub. Date: Aug. 24, 2017

(65) Prior Publication Data
US 2018/0372901 A1    Dec. 27, 2018

(51) Int. Cl.
*G01V 1/48*    (2006.01)
*G01V 1/28*    (2006.01)
(Continued)

(52) U.S. Cl.
CPC ............... *G01V 1/48* (2013.01); *G01V 1/282* (2013.01); *G01V 1/42* (2013.01)

(58) Field of Classification Search
CPC . G01V 1/48; G01V 1/282; G01V 1/42; E21B 47/00
See application file for complete search history.

(56) References Cited

U.S. PATENT DOCUMENTS

2003/0010494 A1   1/2003  Bose et al.
2009/0043554 A1*  2/2009  Horne .................... G01V 3/083
                                                  703/10
(Continued)

FOREIGN PATENT DOCUMENTS

WO      2015104640       7/2015

OTHER PUBLICATIONS

Wikipedia: Memory Management < https://en.wikipedia.org/w/index.php?title=Memory_management&oldid=698810530> version Jan. 8, 2016. (Year: 2016).*

(Continued)

*Primary Examiner* — Alexander Satanovsky
*Assistant Examiner* — Mark I Crohn
(74) *Attorney, Agent, or Firm* — Kilpatrick Townsend & Stockton LLP

(57) ABSTRACT

A system and method are provided for correlating well log data and seismic data corresponding to subterranean formations to generate a seismic well tie that preserves blocking schemes associated with the well log data and constraints corresponding to each block of samples. The seismic well tie may be generated by correlating samples of the well log data with the seismic data by shifting at least some of the samples and using the constraint on changes to the sample values to prevent the sample values of each of the one or more blocks of the samples from changing beyond the constraint. In some aspects, the constraints may relate to a constant velocity or a linearly changing velocity within various blocks of the well log data.

20 Claims, 12 Drawing Sheets

(51) Int. Cl.
   *G01V 1/42* (2006.01)
   *E21B 47/00* (2012.01)

(56) References Cited

U.S. PATENT DOCUMENTS

| | | | |
|---|---|---|---|
| 2010/0044033 A1 | 2/2010 | Menon et al. | |
| 2011/0170373 A1* | 7/2011 | Hsu | G01V 1/282 367/73 |
| 2015/0355358 A1 | 12/2015 | Aarre et al. | |
| 2016/0341835 A1* | 11/2016 | Guillaume | G01V 1/282 |

OTHER PUBLICATIONS

Herrera et al., "A semiautomatic method to tie well logs to seismic data", Geophysics, vol. 79, No. 3, May-Jun. 2014, pp. V47—V54.
Muñoz et al., "Automatic simultaneous multiple well ties", Geophysics, vol. 80, No. 5, Sep.-Oct. 2015, pp. IM45-1M51.
International Patent Application No. PCT/US2016/018596, "International Search Report and Written Opinion", dated Nov. 17, 2016, 18 pages.
CA3,011,722, "Office Action", dated Dec. 19, 2019, 4 pages.
CA3,011,722, "Office Action", dated Mar. 28, 2019, 4 pages.
CA3,011,722, "Office Action", dated May 5, 2020, 4 pages.
FR1750425, "Search Report", dated Feb. 14, 2019, 9 pages.
Herrera et al., "Automatic Approaches for Seismic to Well Tying", Interpretation, vol. 2, No. 2, Apr. 10, 2014, pp. SD9-SD17.
Herron et al., "Tutorial: Tying a Well to Seismic Using a Blocked Sonic Log", Interpretation, vol. 2, No. 2, May 1, 2014, pp. SD1-SD7.
CA. Application No. CA3,011,722, Office Action, dated Dec. 29, 2020, 4 pages.
GB Application No. GB20180011793, "First Examination Report", dated Dec. 11, 2020, 2 pages.

* cited by examiner

_US 11,079,510 B2_

SEISMIC WELL TIES USING BLOCKING SCHEMES

TECHNICAL FIELD

The present disclosure relates generally to seismic well ties, and, more particularly, although not necessarily exclusively, to systems and methods for correlating seismic data and well log data samples using constraints on blocks of the samples.

BACKGROUND

In energy exploration, seismic energy may be generated and transmitted into formations positioned in an area of interest adjacent to a wellbore. Seismic waves may be reflected or refracted off the formations and recorded by acoustic receivers positioned in or near the wellbore. The seismic waves reflected from the formations may be measured as seismic data and used to estimate the properties of the formations in the area of interest. For example, information including the travel time of the seismic waves from the formations to the receivers and the velocity of the seismic waves may be extracted from the seismic data and used to generate images indicative of the properties of the formations.

Well log data may also be generated during wellbore operations to record changes in the formations adjacent to the wellbore at various depths. The well log data may correspond to the area of interest and may be correlated with the seismic data to generate a seismic well tie.

DETAILED DESCRIPTION

Figure 1:
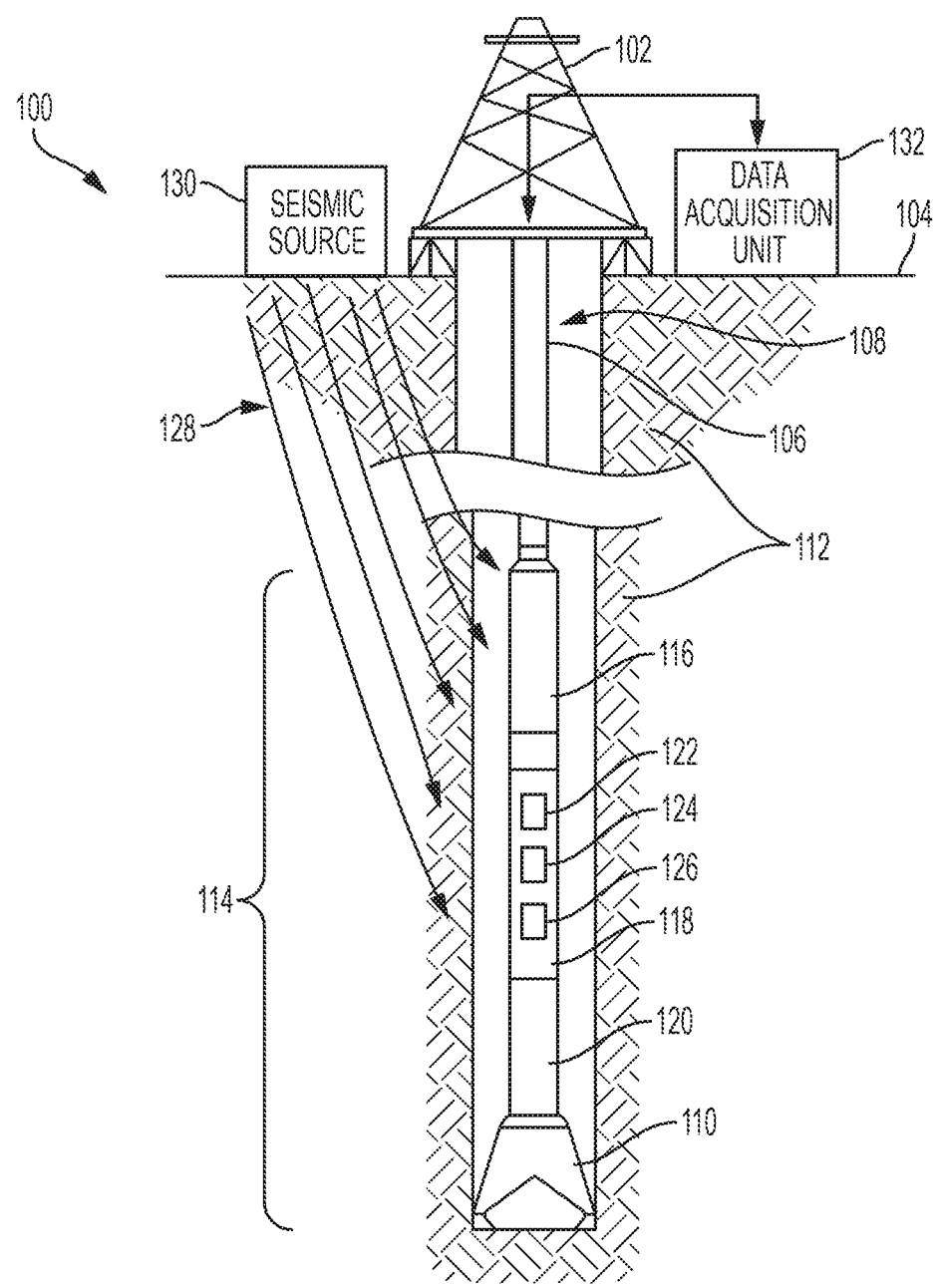
FIG. 1 is a cross-sectional schematic diagram depicting an example of a wellbore environment for acquiring data to generate a seismic well tie according to an aspect of the present disclosure.

Certain aspects and examples of the present disclosure relate to systems and processes for correlating well log data and seismic data corresponding to subterranean formations adjacent to a wellbore to generate a seismic well tie that preserves blocking schemes applied to samples of the well log data and constraints corresponding to each block of samples. In some examples, the seismic data may correspond to seismic wave information measured by seismic sensors (e.g., geophones, hydrophones) in response to seismic energy generated by a seismic source and reflecting or refracting off the subterranean formations. The well log data may correspond to recorded information about the subterranean formations adjacent to a wellbore (e.g., density, velocity) measured by well logging tools positioned in a wellbore. The seismic wave information may be measured in units of time corresponding to the travel time of the seismic waves from the seismic source to the sensors. The well log data may be measured in units of depth corresponding to the depth of the corresponding area of the subterranean formations in the wellbore. An operator of a wellbore environment may wish to correlate, or "tie," the seismic data and the well log data to determine or estimate properties of the subterranean formations at specific depths in the wellbore.

Some well log data may be averaged, or "blocked" into sample intervals. For example, the well log data may be blocked corresponding to the geological layers of the subterranean formations. Each block of samples may be constrained to allow the association of velocity with the geological layer corresponding to each block. To correlate the seismic data and the well log data, a time-depth relationship between the well data and the seismic data may be estimated to generate a synthetic seismic trace that may be shifted to match the original seismic data and generate a seismic well tie. A system according to some aspects of the present disclosure may shift the synthetic seismic trace using the blocking scheme by controlling the shifts for each block of samples. For example, in some aspects, the system may compute an error matrix including a set of alignment errors for each sample of the well log data compared to the seismic data. The error matrix may correspond to a set of potential shifts of each well log data sample in the synthetic seismic trace to match the seismic data.

The system according to some aspects may also accumulate the alignment errors for each block of samples. The errors may be accumulated using the boundaries of each block of well log data and a constraint of a parameter within each block. For example, the samples in each block may include a linear constraint that the velocity associated with each sample is constant within a block. In another example, the samples may include a gradient constraint that the velocity associated with each sample is gradually changing with a constant acceleration. In additional examples, the velocity associated with each sample may change non-linearly. A matrix of the accumulated errors may be generated with each column of the matrix corresponding to the minimum of error sums along various segments in each block of the well log data samples. Each row may correspond to the possible shifts in the well log data to match the seismic data. In additional aspects, the system may also backtrack, starting from the last column of the accumulation matrix to trace a path using the minimum accumulated error corresponding to each block of data. The path may correspond to the required shift of the samples of well log data to match the seismic data.

A system according to some aspects may allow the seismic well tie to be automatically generated, resulting in a faster process to create the seismic well tie. In some aspects, correlating the well log data with the seismic data using the blocking schemes associated with the well log data may also allow for a more accurate seismic well tie. Shifting the well log data while preserving the blocking schemes may maintain the physical sense of the observed subterranean formations as the blocking schemes correspond to properties associated with the subterranean formations. Conversely, generating a seismic well tie without considering the blocks defined for the well log data and the constraints corresponding to each block may result in a well tie having abnormal properties, such as negative velocities or velocities outside of a realistic range. Shifting the well log data samples on a block-by-block basis rather than a sample-by-sample basis, where each sample is considered independent of neighboring samples, may aid in avoiding spikes in a visualization of the seismic well tie that may correspond to the abnormal, or unrealistic, properties of the subterranean formations.

These illustrative examples are provided to introduce the reader to the general subject matter discussed here and are not intended to limit the scope of the disclosed concepts. The following sections describe various additional aspects and examples with reference to the drawings in which like numerals indicate like elements, and directional descriptions are used to describe the illustrative examples but, like the illustrative examples, should not be used to limit the present disclosure. The various figures described below depict examples of implementations for the present disclosure, but should not be used to limit the present disclosure.

Various aspects of the present disclosure may be implemented in various environments. FIG. 1 is a cross-sectional schematic diagram depicting an example of a wellbore environment 100 for acquiring data usable by a system according to some aspects of the present disclosure. The wellbore environment 100 includes a derrick 102 positioned at a surface 104. The derrick 102 may support components of the wellbore environment 100, including a drill string 106. The drill string 106 may include segmented pipes that extend below the surface 104 in a wellbore 108. The drill string 106 may transmit drilling fluid (or drilling mud) necessary to operate a drill bit 110 positioned at the end of the drill string 106. The mud transmitted by the drill string 106 may provide the torque necessary to operate the drill bit 110. The weight of the drill string 106 may provide an axial force on the drill bit 110 that, together with the rotation of the drill bit 110, may aid in drilling the wellbore 108 from the surface 104 through subterranean formations 112 in the earth.

The drill string 106 includes a bottom hole assembly 114 positioned on the drill string 106 uphole of the drill bit 110. The bottom hole assembly 114 includes a combination of various components, such one or more drill collars 116, one or more well tools 118, and a downhole motor assembly 120 for housing a motor for the drill bit 110. The well tools 118 may include tools having one or more measurement devices positionable on the well tools 118 to measure or record wellbore information. In some aspects, the measurement devices may include an array of sensors for sensing resistivity, density, porosity, and other parameters that may be used to generate detailed well logs of the formations 112 penetrated by the wellbore 108. For example, the well tools 118 include an acoustic-logging tool 122 and a density-logging tool 124. In some aspects, the acoustic-logging tool 122 and the density-logging tool 124 may be positioned on separate well tools 118. In other aspects, the acoustic-logging tool 122 and the density-logging tool 124 may be positioned on the same well tool 118. The acoustic-logging tool 122 may generate a sonic log for the wellbore 108 by transmitting acoustic waves toward the formations 112 and detecting the acoustic waves that are reflected or refracted back toward the acoustic-logging tool 122 off the formations 112. The density-logging tool 124 may generate a density log for the wellbore 108 by transmitting gamma rays toward the formations 112 and detecting the gamma rays scattered back off the formations 112.

The measurement devices may also include seismic sensors, such as geophones, configured to sense seismic waves. For example, the well tools 118 include a seismic tool 126 positioned on one of the well tools 118. The seismic tool 126 may operate in response to seismic waves 128 generated by a seismic source 130 positioned at the surface 104 proximate to the wellbore 108. The seismic source 130 may generate seismic energy to form the seismic waves 128 that may be transmitted from the surface 104 through the formations 112 adjacent to the wellbore 108. Non-limiting examples of a seismic source may include an air gun, a plasma sound source, a weight-drop truck, one or more explosive devices, an electromagnetic pulse ("EMP") energy source, and a seismic vibrator. Some of the seismic waves 128 generated by the seismic source 130 may be reflected or refracted by the formations 112 and sensed by seismic sensors positioned on the seismic tool 126.

The measurements received by the sensors of the well tools 118 may be recorded and used by a data acquisition unit 132 at the surface 104 to generate well logs or seismic data to provide information about the wellbore 108 and the formations 112 adjacent to the wellbore 108. In some aspects, the measurements received by the sensors may be stored in a storage device or memory unit positioned downhole in the bottom hole assembly 114 and subsequently retrieved for analysis by the data acquisition unit 132. In other aspects, the well tools 118 may be communicatively coupled to the data acquisition unit 132 by suitable wired or wireless means to collect data from the sensors of the well tools 118. In some aspects, the data acquisition unit 132 may be communicatively coupled to or otherwise include storage means for providing the well log data and the seismic data to a system according to aspects of the present disclosure to generate seismic well ties. Although only one data acquisition unit 132 is shown, the wellbore environment 100 may include any number of units or devices for acquiring information from the well tools 118. Also, though certain devices are shown as positioned on the surface 104 (e.g., the seismic source 130, the data acquisition unit 132) and others are shown as positioned downhole in the wellbore 108 (e.g., the well tools 118), any combination for the position of the devices may be possible to capture seismic data and certain well log data for generating a seismic well tie without departing from the scope of the present disclosure.

Figure 2:
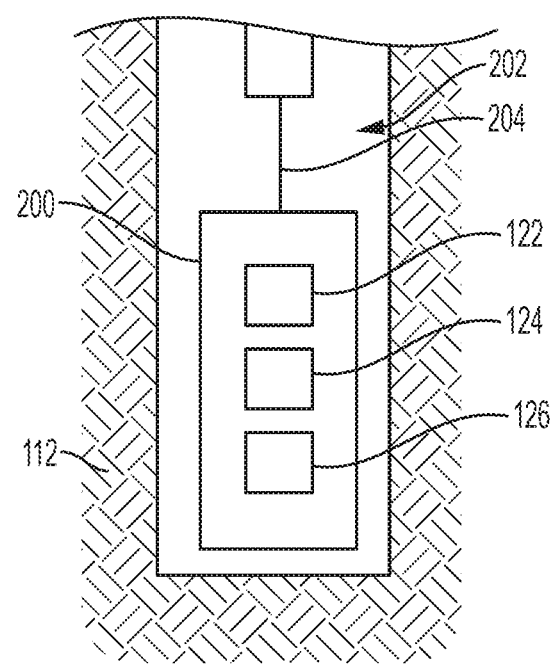
FIG. 2 is a cross-sectional schematic diagram depicting an example of a well tool usable for acquiring data to generate a seismic well tie according to an aspect of the present disclosure.

FIG. 2 is a cross-sectional schematic diagram depicting an example of a well tool 200 usable for acquiring data to generate a seismic well tie according to an aspect of the present disclosure. The well tool 200 is positioned in a wellbore 202 and deployed downhole in the wellbore 202 by a wireline 204. In some aspects, the wireline 204 may be guided into the wellbore 108 using a guide or winch. In additional aspects, the wireline 202 may be wound around a reel positioned at a surface of the wellbore 202. Although the wireline 204 is shown for deploying the well tool 200 into the wellbore 202, the well tool 200 may be deployed by other suitable means, including, but not limited to a slickline or coiled tube, without departing from the scope of the present disclosure.

In some aspects, the well tool 200 may represent one of the well tools 118 of FIG. 1 for generating data corresponding to the formation 112 adjacent to the wellbore 108. In some examples, the well tool 200 includes the acoustic-logging tool 122. In additional and alternative examples, the well tool 200 includes the density-logging tool 124. In further examples, the well tool 200 includes the seismic tool 126.

Figure 3:
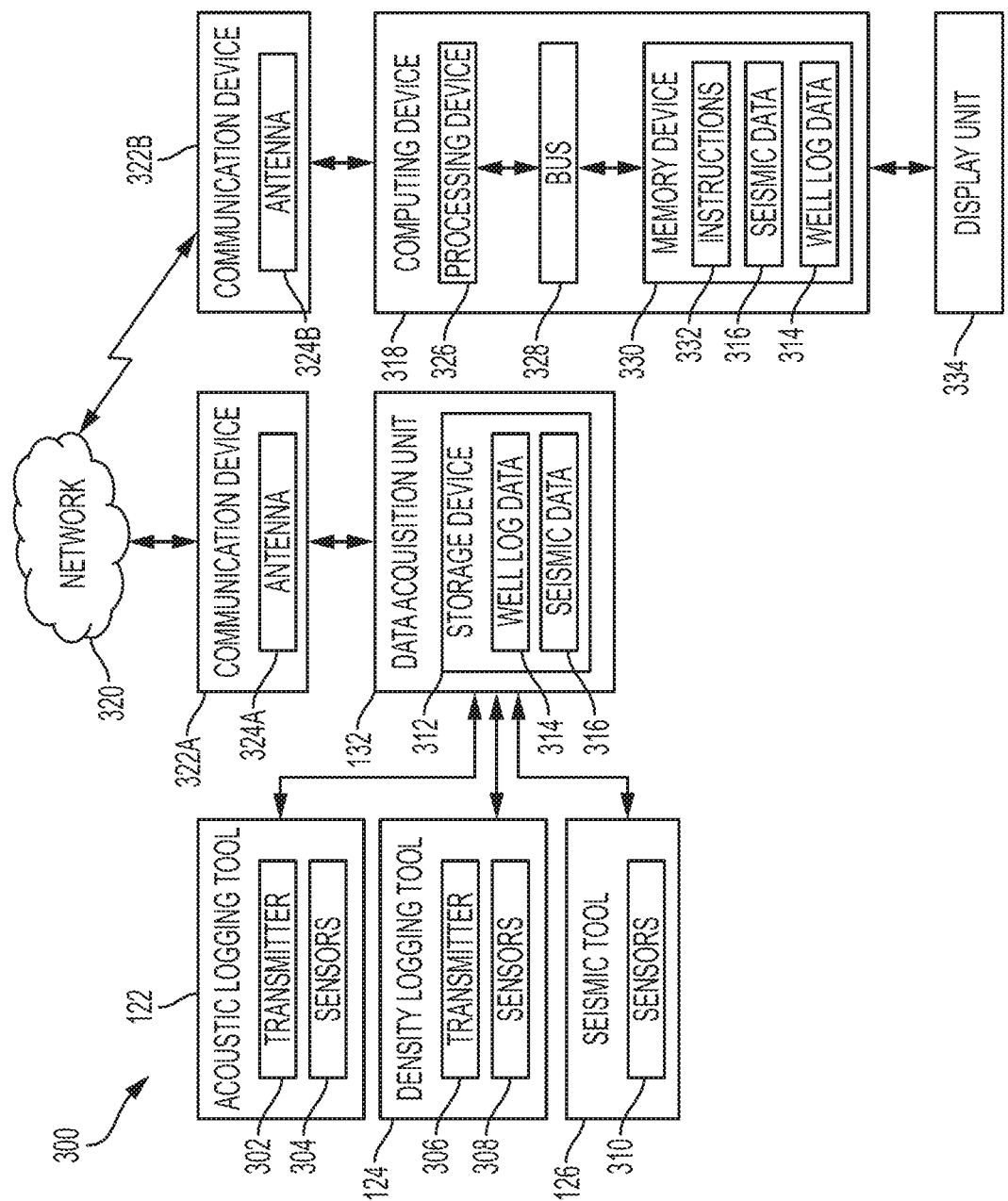
FIG. 3 is a block diagram depicting a system for generating a seismic well tie according to an aspect of the present disclosure.

FIG. 3 is a block diagram depicting a system 300 for generating a seismic well tie according to an aspect of the present disclosure. The system 300 includes the data acquisition unit 132 of FIG. 1. The data acquisition unit 132 may be coupled to the acoustic-logging tool 122, the density-logging tool 124, and the seismic tool 126 of FIGS. 1-2. The acoustic-logging tool 122 may generate a sonic log for a wellbore (e.g. wellbore 108 of FIG. 1). The acoustic-logging tool 122 includes a transmitter 302 and one or more sensors 304. In some aspects, the transmitter 302 may be configured to transmit acoustic waves or elastic waves through mud toward formations adjacent to the wellbore (e.g., formations 112 adjacent to the wellbore 108 in FIG. 1). The elasticity of the formations may permit propagation of the waves. In some aspects, the sensors 304 may detect the waves reflected or refracted off the formations for determining the velocity of the waves in terms of the travel time from the transmitter 302 to the formations and to the sensors 304. The density-logging tool 124 includes a transmitter 306 and one or more sensors 308. The transmitter 306 may generate gamma rays and transmit the gamma rays toward the formations. The sensors 308 may be positioned to detect the gamma rays scattered back from the formations for measuring the density of the formations. The seismic tool 126 may include one or more sensors for detecting seismic waves generated by a seismic source (e.g., seismic source 130 of FIG. 1) and reflected or refracted off the formations for generating images of the formations.

In some aspects, the data acquisition unit 132 of FIG. 1 may receive the information from the acoustic-logging tool 122, the density-logging tool 124, and the seismic tool 126. The data acquisition unit 132 includes a storage device 312, such as a database, memory device, or other storage means for storing the information received from the acoustic-logging tool 122, the density-logging tool 124, and the seismic tool 126. The storage device 312 may store the data generated from the acoustic-logging tool 122 and the density-logging tool 124 as well log data 314. The storage device 312 may store the data generated from the seismic tool as seismic data 316. In some aspects, the well log data 314 and the seismic data 316 may include raw data from the sensors 304, 308, 310 of the tools 122, 124, 126, respectively. In additional aspects, the data acquisition unit 132 may include a processor for processing the data received from the tools 122, 124, 126 to generate a well log and a seismic trace that may be stored as the well log data 314 and the seismic data 316, respectively. In other aspects, the tools 122, 124, 126 or an intermediate device between the tools 122, 124, 126 and the data acquisition unit 132 may include processing means for processing some or all of the measurements received by the sensors 304, 308, 310 prior to transmitting to the data acquisition 132.

The system 300 includes a computing device 318 that is communicatively coupled to the data acquisition unit 132. In some aspects, the computing device 318 may be positioned in the wellbore environment 100 of FIG. 1. In other aspects, the computing device 318 may be positioned in a remote location away from the wellbore environment 100. In some aspects, the well log data 314 and the seismic data 316 may be transmitted from the data acquisition 132 to the computing device 318 via a network 320. The data acquisition unit 132 and the computing device 318 may be coupled to, or include, respective communication devices 322A, 322B. The communication devices 322A, 322B may each include or may be coupled to an antenna 324A, 324B, respectively for transmitting and receiving information via the network 320.

The computing device 318 may include a processing device 326, a bus 328, and a memory device 330. The processing device 326 may execute one or more operations for generating a seismic well tie using the well log data 314 and the seismic data 316. The processing device 326 execute one or more processes for generating a seismic well tie using the well log data 314 and the seismic data 316. The processing device 326 may execute instructions 332 stored in the memory device 330 to perform the operations. The processing device 326 may include one processing device or multiple processing devices. Non-limiting examples of the processing device 326 may include a field-programmable gate array ("FPGA"), an application-specific integrated circuit ("ASIC"), a microprocessor, etc. The memory device 330 may include any type of storage device that retains stored information when powered off. Non-limiting examples of the memory device 330 may include electrically erasable and programmable read-only memory ("EEPROM"), a flash memory, or any other type of non-volatile memory. In some examples, at least a portion of the memory device 330 may include a computer-readable medium from which the processing device 326 can read the instructions 332. A computer-readable medium may include electronic, optical, magnetic, or other storage devices capable of providing the processing device 326 with computer-readable instructions or other program code. Non-limiting examples of a computer-readable medium include, but are not limited to, magnetic disks, memory chips, ROM, random-access memory ("RAM"), an ASIC, a configured processor, optical storage, or any other medium from which a compute processor can read the instructions 332. The instructions 332 may include processor-specific instructions generated by a compiler or an interpreter from code written in any suitable computer-programming language, including, for example, C, C+++, C#, etc.

In some examples, the instructions 332 may include one or more equations usable for generating a seismic well tie. For example instructions 332 may include the following discretization equation for calculating a seismic well tie that takes into account a blocking scheme of estimated velocity logs from the well log data 314:

$$\min_{\tau \in F^m} \Sigma_{i=1}^n (S_1(i) - S_2(i+\tau(i)))^2, \qquad \text{[Equation 1]}$$

where $F^m$ is defined as an approximation space of piecewise functions, m is the total number of blocks in the blocking scheme associated with the well log data 314, the block boundaries in the time domain are $\{t_0=0, t_1, t_2, \ldots, t_{m-1}, t_m=T\}$, and the $S_1$, $S_2$ are synthetic and real seismic traces.

The instructions 332 may also include equations for generating a path between blocks of samples of the well log-data 314 using constraints associated with blocks of the samples. The following equation may be used to generate a path for blocks of the samples constrained to have a constant velocity within the block:

$$\frac{\tau_b - \tau_a}{t_b - t_a} = \frac{\tau_c - \tau_b}{t_c - t_b}, \quad \text{[Equation 2]}$$

$$\left[\frac{(d_b - d_a)}{(t_b + \tau_b - (t_a + \tau_a))}\right] / \left[\frac{(d_b - d_a)}{(t_b + t_a)}\right] = \quad \text{[Equation 3]}$$
$$\left[\frac{(d_c - d_b)}{(t_c + \tau_c - (t_b + \tau_b))}\right] / \left[\frac{(d_c - d_b)}{(t_c + t_b)}\right],$$

where $t_a$, $t_b$, and $t_v$ are three times within a block of well log data 314, $\tau_a$, $\tau_b$, and $\tau_c$ are the corresponding shifts in time, $d_a$, $d_b$, and $d_c$ are the corresponding distances in depth. The constant velocity within the blocks may allow the slope of the path between two known samples within the block (e.g., samples taken at times $t_a$ and $t_b$) may be used to determine the slope between any two samples in the block (e.g., samples taken at times $t_b$ and $t_c$) to generate the path for the collective block of samples.

The following equations may be used to generate a path for blocks of the samples constrained to have a gradually changing velocity with a constant, non-zero acceleration within the block:

$$\frac{d^2 D}{dt^2} = C_0, \quad \text{[Equation 4]}$$

$$\frac{dt}{dD} = \frac{1}{C_o t + C_1}, \quad \text{[Equation 5]}$$

$$\frac{d\tau}{dD} = \frac{1}{C_0'(t+\tau) + C_1'} - \frac{dt}{dD} \quad \text{[Equation 6]}$$

where d represents distance, D represents a depth, and C represents a constant acceleration. Equation 5 is the derivative of time with respect to depth D, and Equation 6 is the derivative of the shifting function T with respect to depth D. The equations may provide the curvature of a shifting path between blocks of the well log data 314 to correlate the well log data 314 with the seismic data 316. In some aspects, the instructions 332 may include additional equations to generate a path for blocks of the samples constrained to have velocities that change non-linearly within the block.

The instructions 332 may also include the following equation for calculating a reflection coefficient of the well log data 314 for generating the synthetic seismic trace:

$$R_0 = \frac{(\rho_2 v_2 - \rho_1 v_1)}{(\rho_2 v_2 - \rho_1 v_1)}, \quad \text{[Equation 7]}$$

where ρ is the rock density and v is the rock velocity at a first boundary and a second boundary.

The instructions 332 may also include the following equation for calculating an error matrix for samples of the well log data 314 within a range of integer shifts:

$$e(i,j) = (S_1(i) - S_2(i+j))^2, \quad \text{[Equation 8]}$$

where i and j are integers, and $S_1$, $S_2$ are synthetic and real seismic traces.

The instructions 332 may also include the following equation for calculating the accumulation errors within a block of the well log data 314:

$$d(k, l) = \max_{r_1 \leq r \leq r_2} d(k+r, l-1) + \int_{x(t_{l-1}, t_l)} e(\alpha, \beta), \quad \text{[Equation 9]}$$

where l is a block boundary, and the integral is taken from paths connecting lag k in a current boundary $t_l$ and lag k+r in the preceding boundary $t_{l+1}$.

In some aspects, the computing device 318 may generate images or graphs associated with the information received or generated by the processing device 326 to be displayed on a display unit 334. In additional and alternative aspects, the instructions 332 may include computer-programming code for causing the processing device 326 of the computing device 318 to generate one or more user interfaces on the display unit 334. The display unit 334 may include any CRT, LCD, OLED, or other device for displaying interfaces generated by the processing device 326.

Figure 4:
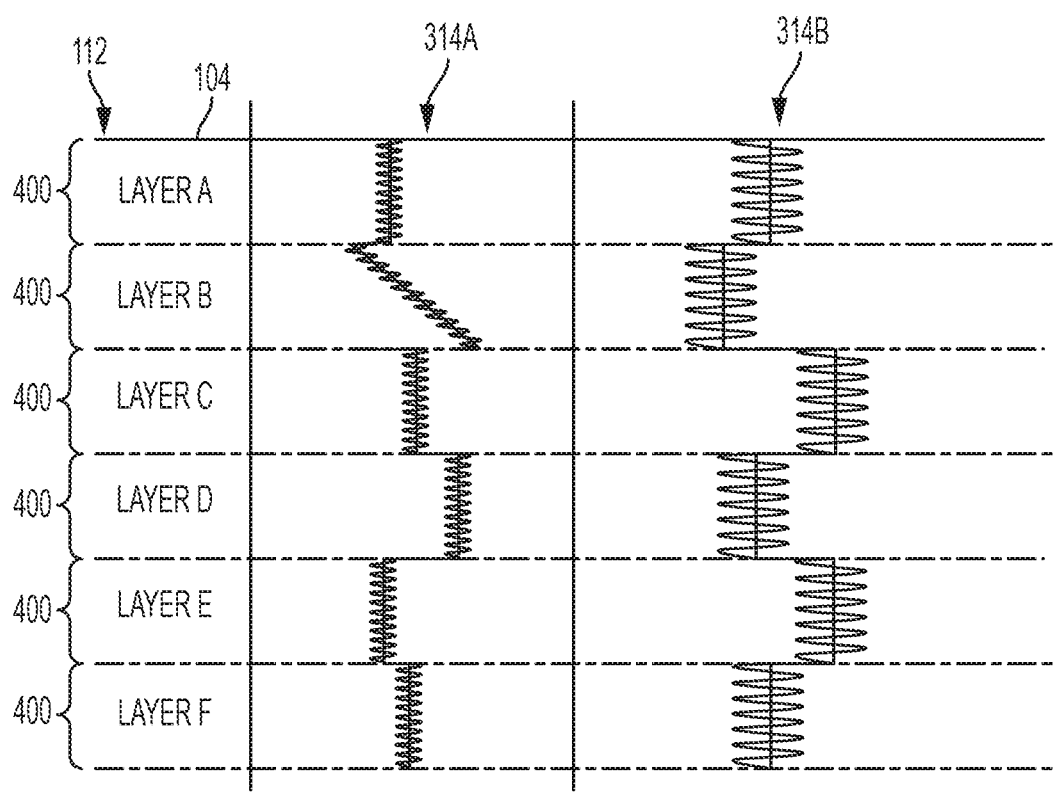
FIG. 4 is a graph of an example of the well log data of FIG. 3 in a blocking scheme according to an aspect of the present disclosure.

FIG. 4 is a graph of an example of the well log data 314 of FIG. 3 in a blocking scheme according to an aspect of the present disclosure. In some aspects, the well log data 314 of FIG. 3 includes at least a sonic log 314A and a density log 314B. The sonic log 314A and the density log 314B shown in FIG. 4 are artificial logs to illustrate the blocking scheme and may not correspond to real data. In some examples, the sonic log 314A may be generated from measurements by a logging tool, such as the acoustic-logging tool 122 of FIG. 3. The density log 314B may be generated from measurements by a logging tool, such as the density-logging tool 124 of FIG. 3. The sonic log 314A and the density log 314B may be plotted against the subterranean formations 112 adjacent to the wellbore 108 of FIG. 1 or 2 to which the measurements correspond. In some examples, the measurements of the sonic log 314A and the density log 314B may be measured in units of depth that may be later converted to the time domain for generating a seismic well tie with seismic data corresponding to the same subterranean formations 112. The depth may be measured from the surface 104 down through layers of the subterranean formations 112. The logs 314A, 314B may be separated into "blocks" to capture significant changes in the data samples of the logs 314A, 314B. In some aspects, each of the blocks may be the same size. In other aspects, the blocks may be of varying sizes. For instance, one block may correspond to 100 meters of the subterranean formations 112 and a second block may correspond only to 50 meters of the subterranean formations 112. In some aspects, the blocks may correspond to geological layers of the subterranean formations 112. For example, in FIG. 4, the sonic log 314A and the density log 314B are separated into blocks 400 for each of layers A-F of the subterranean formations 112. The layers A-F may correspond to different lithology of the formations 112. Non-limiting examples of layers A-F include mudstone, sandstone, siltstone, halite, and gypsum. In other aspects, the logs 314A, 314B may be blocked according to other properties of the subterranean formations. For example, the logs 314A, 314B may be blocked according to other properties of the subterranean formations. For example, the data corresponding to each of the logs 314A, 314B may indicate certain trends in the subterranean formations 112 at different depth ranges in the wellbore 108 and the data may be blocked to capture the trends, where the blocks are bounded at transitions between trends. In further examples, the blocks may be manually defined.

Figure 5:
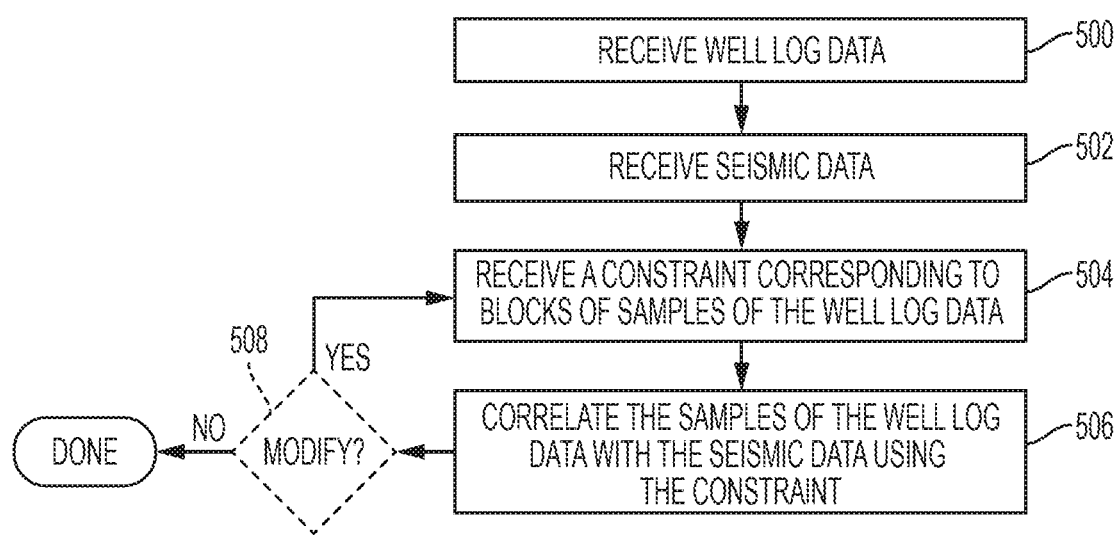
FIG. 5 is a flow chart of a process for correlating well log data and seismic data to generate a seismic well tie according to an aspect of the present disclosure.
Figure 6:
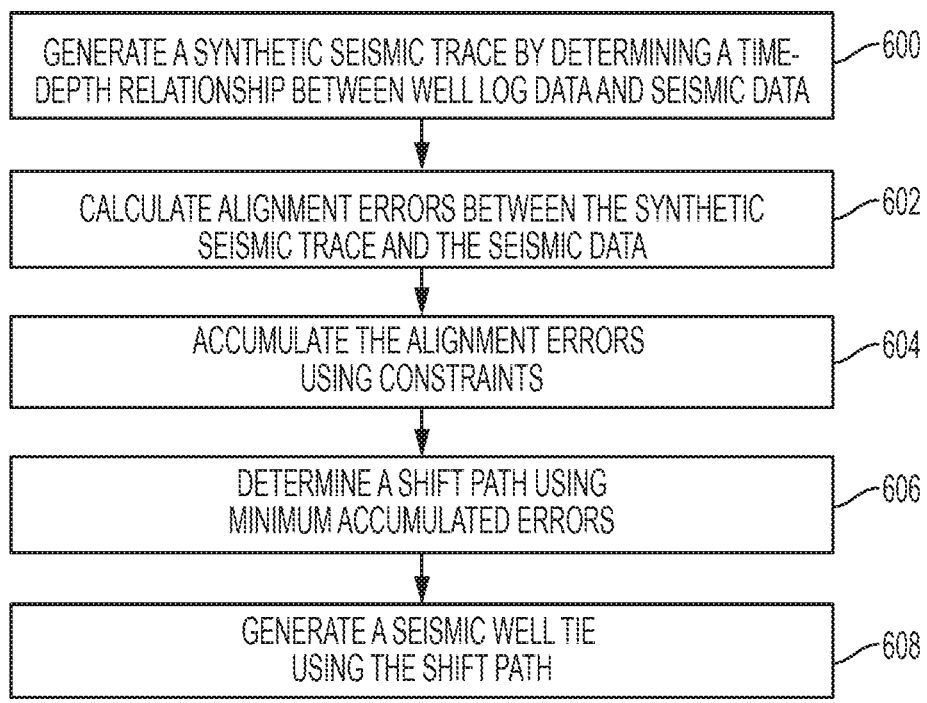
FIG. 6 is a flow chart of a process for shifting well log data using a constraint to correlate the well log data and the seismic data according to an aspect of the present disclosure.

FIGS. 5 and 6 are flow charts of examples of processes that may be used to generate a well tie by correlating well log data and seismic data. The processes are described with respect to the wellbore environments of FIGS. 1 and 2 and the system of FIG. 3 unless otherwise indicated, although other implementations are possible without departing from the scope of the present disclosure.

FIG. 5 is a flow chart of a process for generating a seismic well tie according to an aspect of the present disclosure. In block 500, the computing device 318 receives the well log data 314. In some aspects, the well log data 314 may be received from one or more well logging tools. In some aspects, the well logging tools may be positioned in the wellbore 108. For example, the well logging tools may include the well tools 118 of FIG. 1. Examples of the well logging tools may include the acoustic-logging tool 122, the density-logging tool 124, and any other tool for measuring parameters of the subterranean formations 112 adjacent to the wellbore 108. In some aspects, the computing device 318 may receive the well log data 314 as unprocessed data. In other aspects, the well log data 314 may be received as processed data, or as a combination of unprocessed and processed data.

In block 502, the computing device 318 receives the seismic data 316. In some aspects, the seismic data may be received from the seismic tool 126. The seismic tool 126 may be positioned in the wellbore 108. For example, the seismic tool 126 may be coupled to the drill string 106 as a well tool 118 shown in FIG. 1. In other examples, the seismic tool 126 may be positioned on the surface 104 and sensors 310 may be positioned to receive seismic energy waves generated by a seismic source positioned in the wellbore 108 and reflecting off the subterranean formations 112.

In block 504, the computing device 318 receives a constraint corresponding to blocks of samples of the well log data 314. In some aspects, the computing device 318 may receive a blocking scheme associated with the well log data 314. The blocking scheme may separate samples of the well log data 314 into blocks. In some aspects, the blocks may be related to layers determined by contiguous portions of the formations 112 having the same lithology or other geological feature. In other aspects, the blocks of samples of the well log data 314 may correspond to other trends or information. In additional and alternative aspects, the blocking scheme may correspond to inputs by a user of the computing device 318. For example, a user may define the boundaries of each block based on the user's desire or the user's interpretation of the well log data 314. For example, if a blocking scheme is not provided with the well log data 314, the computing device 318 may receive a blocking scheme having constraints corresponding to blocks of the samples of the well log data 314 from the user. In another example, the computing device 318 may receive an initial blocking scheme with the well log data 314, but may receive a modification of the blocking scheme from the user. Non-limiting examples of modifications to the blocking scheme may include modifying a constraint within a block, inserting an additional block, removing a block, and modifying the size of one or more of the blocks.

Each block of samples of the well log data 314 may have an associated constraint corresponding to a parameter of the well log data 314. In some aspects, the parameter may correspond to the velocity determined by a well log included as well log data 314. For example, a sonic log 314A may be included in the well log data 314. The sonic log 314A may measure the time it takes for acoustic waves to travel from the transmitter 302 of the acoustic-logging tool 122 to the subterranean formations 112 and back to the sensors 304 of the acoustic-logging tool 122. Velocity measurements may be determined from these measurements. In other aspects, the constraints may be defined by the user of the computing device 318 based on the user's desire. Non-limiting examples of constraints include constraining the velocity measurements in a block of well log data 314 to a constant velocity, constraining the velocity measurements in a block to a gradually changing velocity with constant acceleration, and constraining the velocity measurements in a block to a velocity changing non-linearly. In some aspects, different blocks 400 of the well log data 314 may have different constraints. For example, as shown in FIG. 4, the blocks 400 may include a first block corresponding to Layer A that may be include sonic log data 314A constrained to a constant velocity and a second block corresponding to Layer B that may be a transitional layer having samples of well log data 314 constrained to a constant acceleration but a gradually changing velocity.

In block 506, the computing device 318 may correlate the samples of the well log data 314 and the seismic data 316 using the constraint. In some aspects, the well log data 314 and the seismic data 316 may be correlated by shifting at least some of the well log data 314 to match or align a trace of the well log data 314 to a trace of the seismic data 316. Shifting the well log data 314 may be constrained by the constraints received by the computing device 318 for one or more of the blocks of samples of the well log data 314.

FIG. 6 is a flow chart of a process for shifting well log data using a constraint to correlate the well log data and the seismic data as described in block 506 of FIG. 5 according to an aspect of the present disclosure.

In block 600, a synthetic seismic trace may be generated by the computing device 318. The computing device 318 may generate the synthetic seismic trace using the well log data 314. For example, the computing device 318 may calculate vertical reflection times to determine a time-depth relationship. The vertical reflection times may correspond to the time it takes the acoustic waves or gamma waves generated by the acoustic-logging tool 122 and the density-logging tool 124, respectively, to travel in the wellbore. In some aspects, equations relating velocity, distance (or depth) may be used to determine the time-depth relationship using the well log data 314. The computing device 318 may combine the vertical reflection times with a reflection coefficient. In some aspects, the instructions 332 stored in the memory device 330 of the computing device 318 may include equations, including Equation 7, to calculate a reflection coefficient for a block of well log data 314 using the velocity measurement from the sonic log 314A and the density log 314B. The computing device 318 may also choose a wavelet of the seismic data 316 having a similar amplitude and convolve the with the combined vertical reflection times and reflection coefficients to create the synthetic seismic trace for comparison with the seismic data 316.

In block 602, the computing device 318 calculates alignment errors between the synthetic seismic trace and the seismic data. The synthetic seismic trace generated in block 600 may have the same vertical scale as a trace of the seismic data 316. The computing device 318 may compare or match the synthetic seismic trace and the seismic data and determine errors in their alignment. In some aspects, the computing device 318 may include instructions, including Equation 8, to calculate a matrix of the alignment errors. The computing device may calculate the errors by comparing each sample of the well log data 314 making up the synthetic seismic trace to each sample of the seismic data 316 to determine the alignment errors with respect to each sample.

Figure 7:
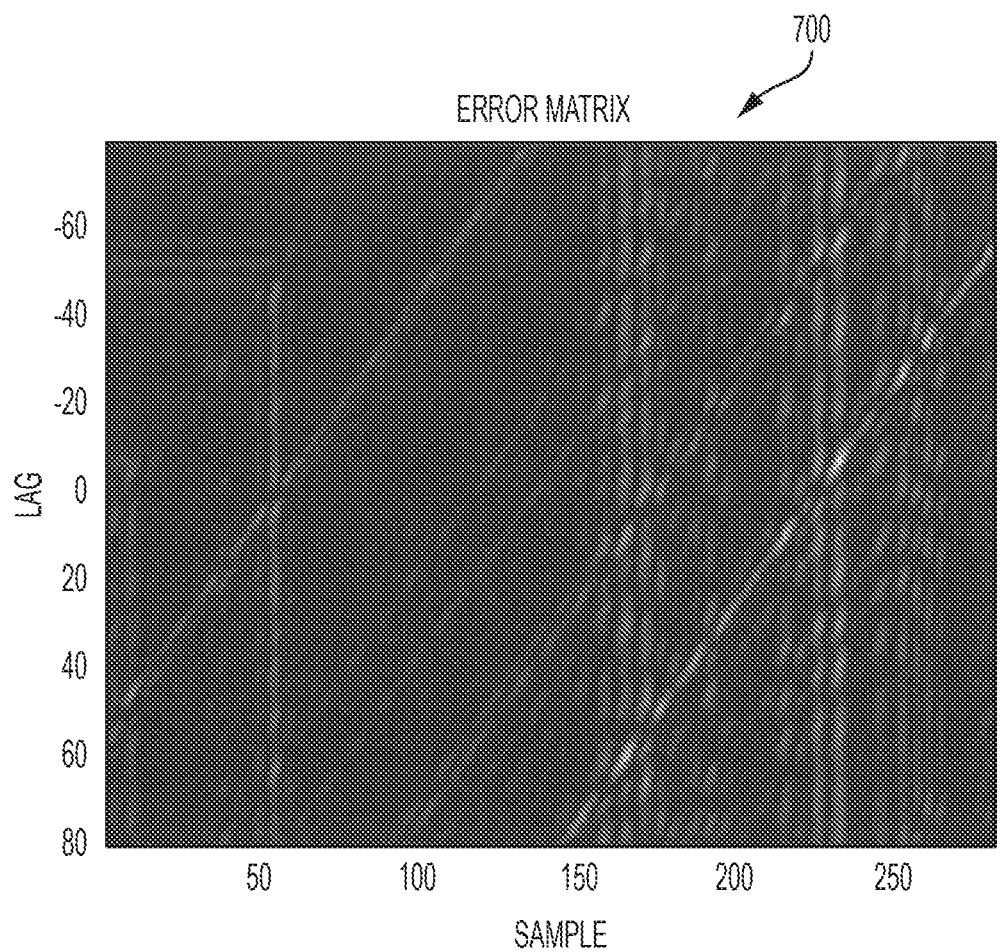
FIG. 7 is a graph of an example of an error matrix useable for generating a seismic according to an aspect of the present disclosure.

FIG. 7 is a graph of an example of an error matrix 700 useable for generating a seismic well tie according to an aspect of the present disclosure. The error matrix 700 may include the alignment errors. In some aspects, each column may correspond to a different sample of the synthetic seismic trace and each row may correspond to the alignment error between the synthetic seismic trace and the seismic data 316.

Returning to FIG. 6, in block 604, the computing device accumulates the alignment errors calculated in block 602 for each block of well log data 314 in the synthetic seismic trace. The errors may be accumulated at the boundaries of the blocks using instructions 332 stored in the memory device 330 of the computing device 318. The accumulation may take into account the constraints in each block of the well log data 314. For example, the computing device 318 may use Equations 2-3 for blocks having a constant velocity and Equations 4-6 for blocks having linearly changing velocity and a constant, non-zero acceleration. In some examples, the computing device 318 may use Equation 9 to accumulate the errors in the accumulation matrix. In some aspects, the range or thicknesses of each block may vary among different geological layers. The computing device 318 may be configured to control the range of the blocks, so that the calculations are not too narrow or large. The equations may allow for the upper strain and the lower strain constraint to be used as boundaries to make the range of the velocities proportional to the block length.

Figure 8:
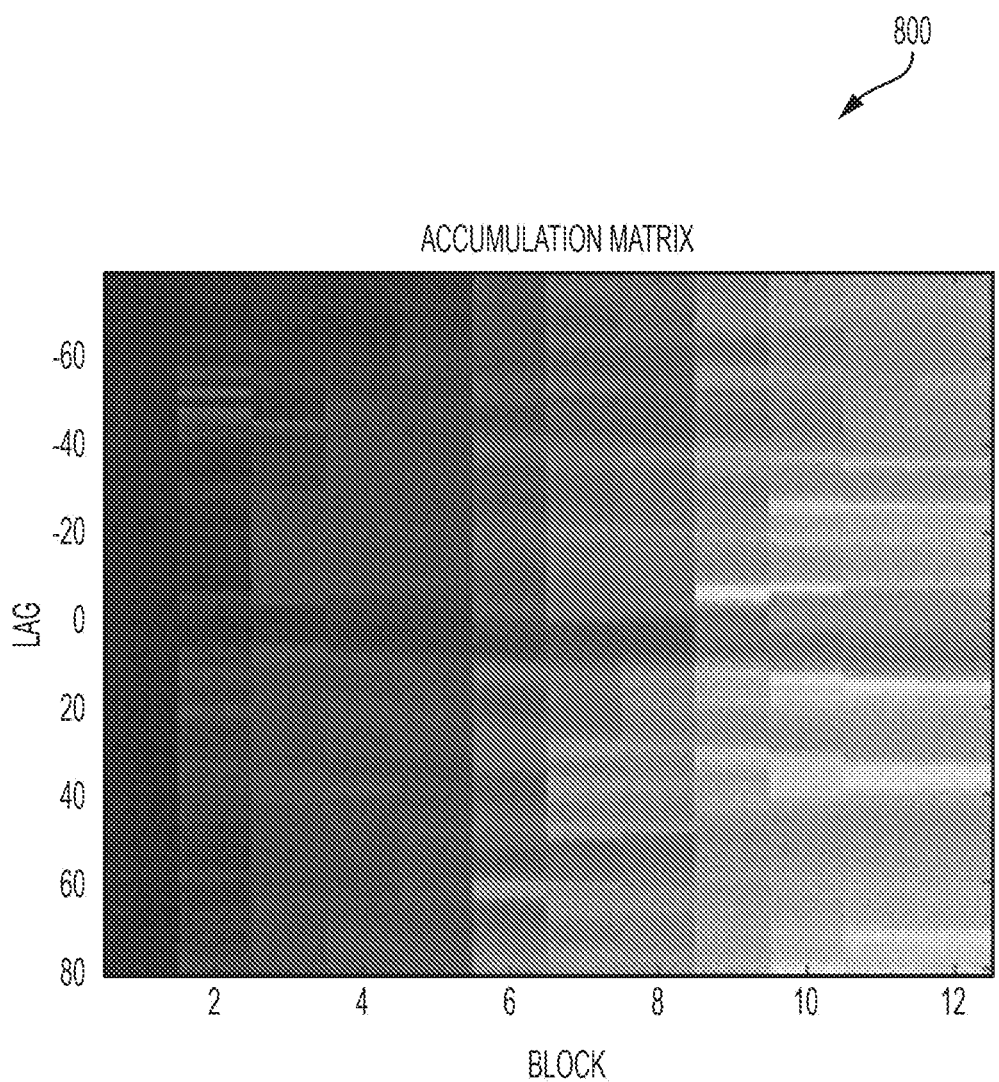
FIG. 8 is a graph of an example of an accumulation matrix useable for generating a seismic well tie according to an aspect of the present disclosure.

FIG. 8 is a graph of an example of an accumulation matrix 800 useable for generating a seismic well tie according to an aspect of the present disclosure. The accumulation matrix 800 may be of size L×m, where L is the possible number of shifts and m is the number of blocks. Each column of the accumulation matrix 800 may include the minimum of an addition of the accumulated error from the previous block and error sums along different linear segments within the current block. The segments may be straight lines for blocks having constant velocity constraints. For linearly changing velocities, the paths may be numerically computed using Equations 4-6. In some aspects, the accumulation matrix 800, including the minimum values and the lags from the preceding block boundaries may be stored in the memory device 330.

Returning to FIG. 6, in block 606, the computing device 318 may determine a shift path. In some aspects, the computing device 318 may sort all of the accumulated errors in the accumulation matrix 800 of FIG. 8 and identify the minimum accumulated errors for each of the blocks. The computing device 318 may generate an optimal shift path by backtracking from the last column of the accumulation matrix 800 and using the minimum accumulated error in each column (each column representing a block) as path points to generate the shift path. In some aspects, the computing device 318 may also quickly identify a series of optimal lags in the forward direction using the lags stored in the memory device 330.

Figure 9:
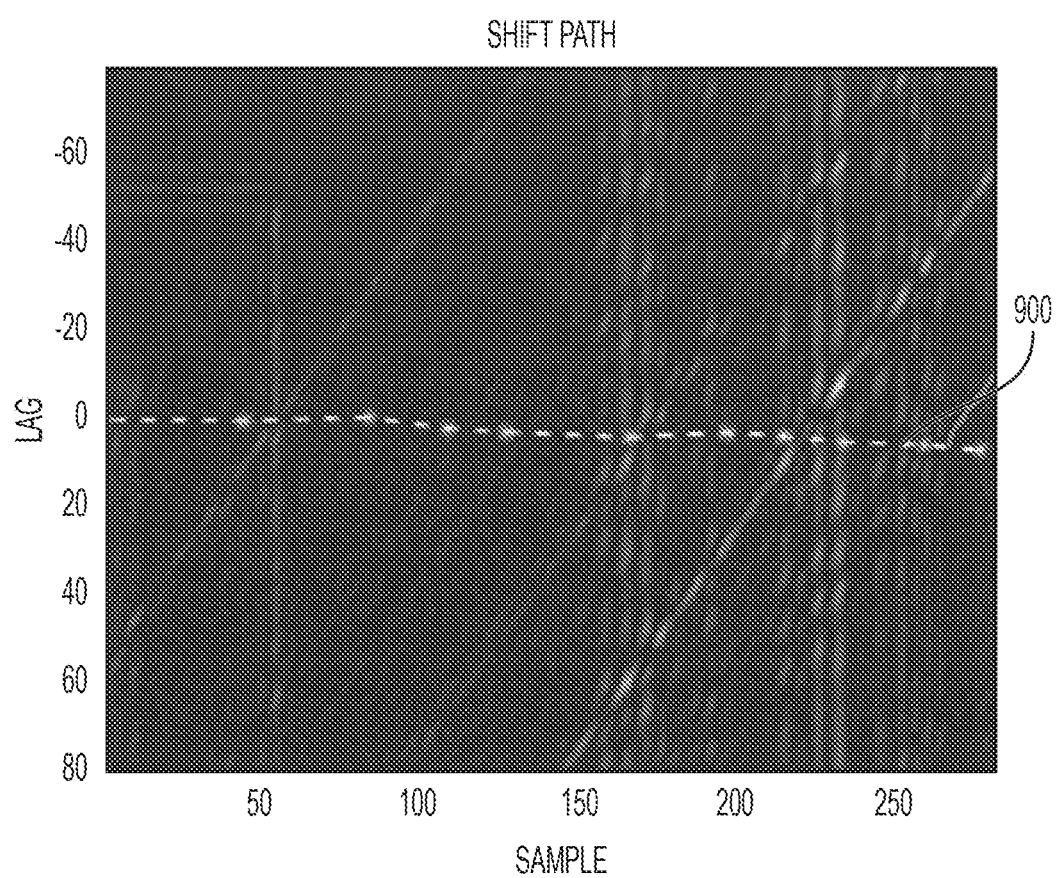
FIG. 9 is a graph of an example of a shift path useable for generating a seismic well tie according to an aspect of the present disclosure.

FIG. 9 is a graph of an example of a shift path 900 useable for generating a seismic well tie described in block 606 of FIG. 6 according to an aspect of the present disclosure. In this example, the shift path 900 is generated using a linear constraint on each block where the velocities within each block are constant. The linear constrain causes the shift path to form a straight line as the shift path 900 is connected between each of the blocks of samples of the well log data 314. The Equations 2-3 may be used by the computing device 318 for determining the slope of the path between the boundaries of the block of well log data 314 associated with the constraint. In other aspects, the constraint may be a gradually changing velocity with a constant acceleration. This constraint may result in a curved line between the points of the shift path 900. The Equations 4-6 may be used by the computing device 318 for determining the shape of the path corresponding to the constraint associated with the block. Although only these constraints are described, any constraints may be associated with the blocks of the well log data 314 and may affect the shape of the shift path via the mathematical relationship of the constraint within the boundaries of the block of well log data 314 having the constraint.

Returning to FIG. 6, in block 608, the computing device 318 may shift the synthetic seismic trace along the shift path between each block of the well log data 314 to generate a seismic well tie. In some aspects, the seismic well tie may match the seismic data 316 and include information related to the depth of the subterranean formations 112 analyzed by the computing device 318. In some aspects, the computing device 318 may use instructions 332 stored in the memory device 330, including Equation 1, to shift the synthetic seismic trace of the well log data 314 to match the seismic data 316 using the shift path 900.

Returning to the process of FIG. 5, subsequent to generating a seismic well tie by correlating the samples of the well log data 314 and the seismic data 316 as described in block 508 and the process of FIG. 6, the computing device 318 may optionally be configured to receive a new constraint used for the correlation. The process of FIG. 5 includes an additional optional step, indicated by the dashed block 508, in which the computing device 318 may determine whether to modify the seismic well tie generated by the correlation described in block 506. In some aspects, the computing device 318 may generate one or more user interfaces including selection tools for allowing a user of the computing device 318 to modify the constraint used to correlate the samples of the well log data 314 and the seismic data 316. For example, the computing device 318 may generate a user interface having a selection option for allowing the user to select whether a modification of the constraint is required. In response to a signal corresponding to a user selection to modify, the computing device 318 may determine that a modification is required and generate a user interface including an input selection tool to receive the new constraint as described in step 504. In another example, the computing device 318 may generate a user interface having the input selection tool to receive the new constraint and may determine that a modification is required in response to receiving the new constraint via the input selection tool as described in block 504. In this manner, the computing device 318 may simultaneously implement the steps of blocks 504, 508.

Figure 10:
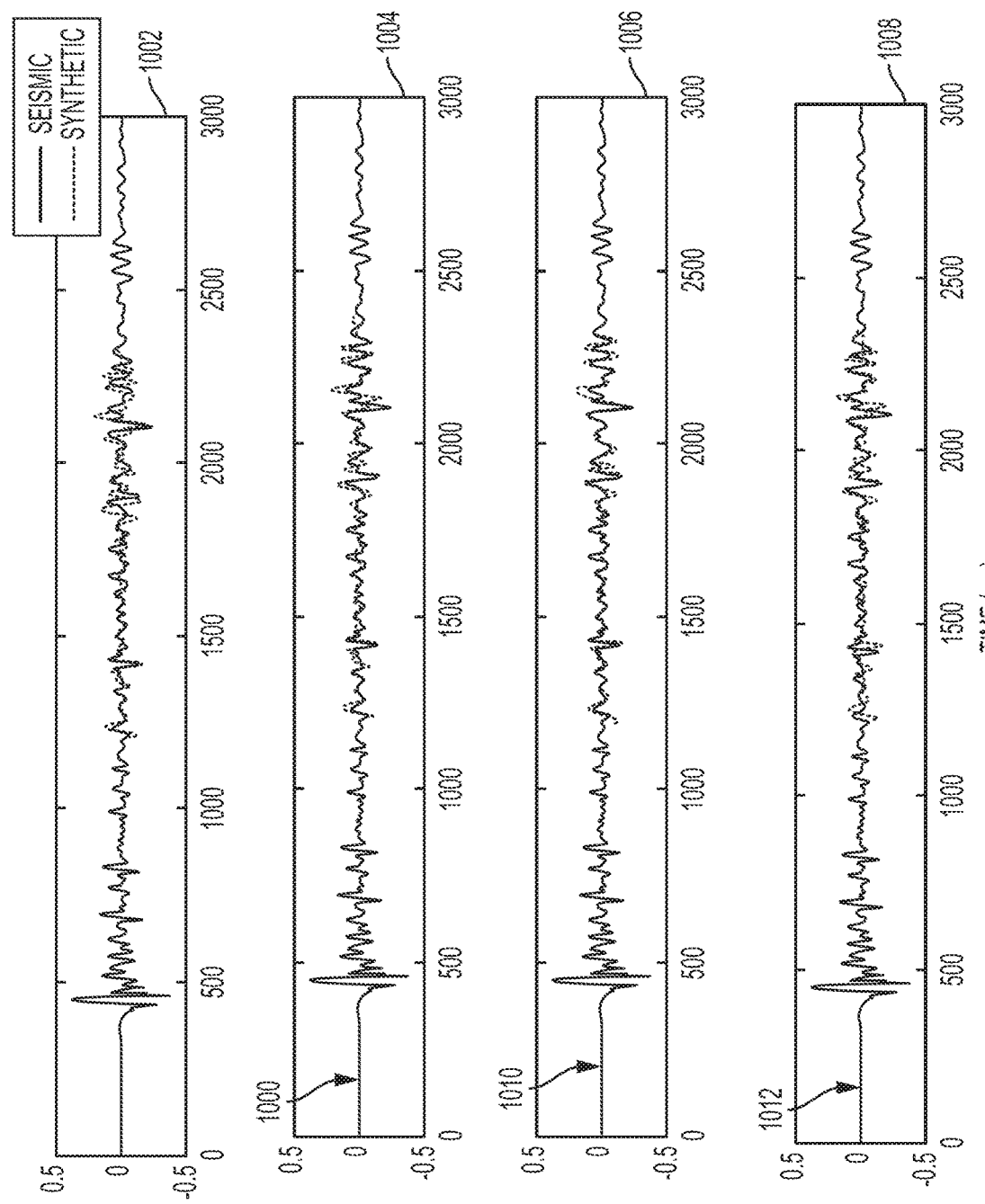
FIG. 10 is a graph of an example of a seismic well tie generated using the processes of FIGS. 5-6 according to an aspect of the present disclosure.

FIG. 10 is a graph of an example of the seismic well tie 1000 described in block 608 of FIG. 6 according to an aspect of the present disclosure. Graph 1002 illustrates the original seismic data 316 overlaid with the synthetic seismic trace generated using the well log data 314 prior to shifting of the synthetic seismic trace. Graph 1004 shows the seismic well tie 1000 with the synthetic seismic trace being shifted to match the seismic data 316 using the process described in FIGS. 5-6. For comparison, graphs 1006 and 1008 show seismic well ties 1010, 1012, respectively, generated using other processes. The seismic well tie 1010 in graph 1006 may be generated using a dynamic time warping process where the tying of the well log data 314 to the seismic data 316 is performed on a sample-by-sample basis. The seismic well tie 1012 in graph 1008 may be generated using a bulk shifting process where the entire synthetic seismic trace is shifted (in bulk) to match the seismic data. As indicated by the comparison of the seismic well tie 1000 to the seismic well ties 1010, 1012 the seismic well tie 1000 illustrates a seismic well tie that is balanced between accuracy and smoothness.

Figure 11:
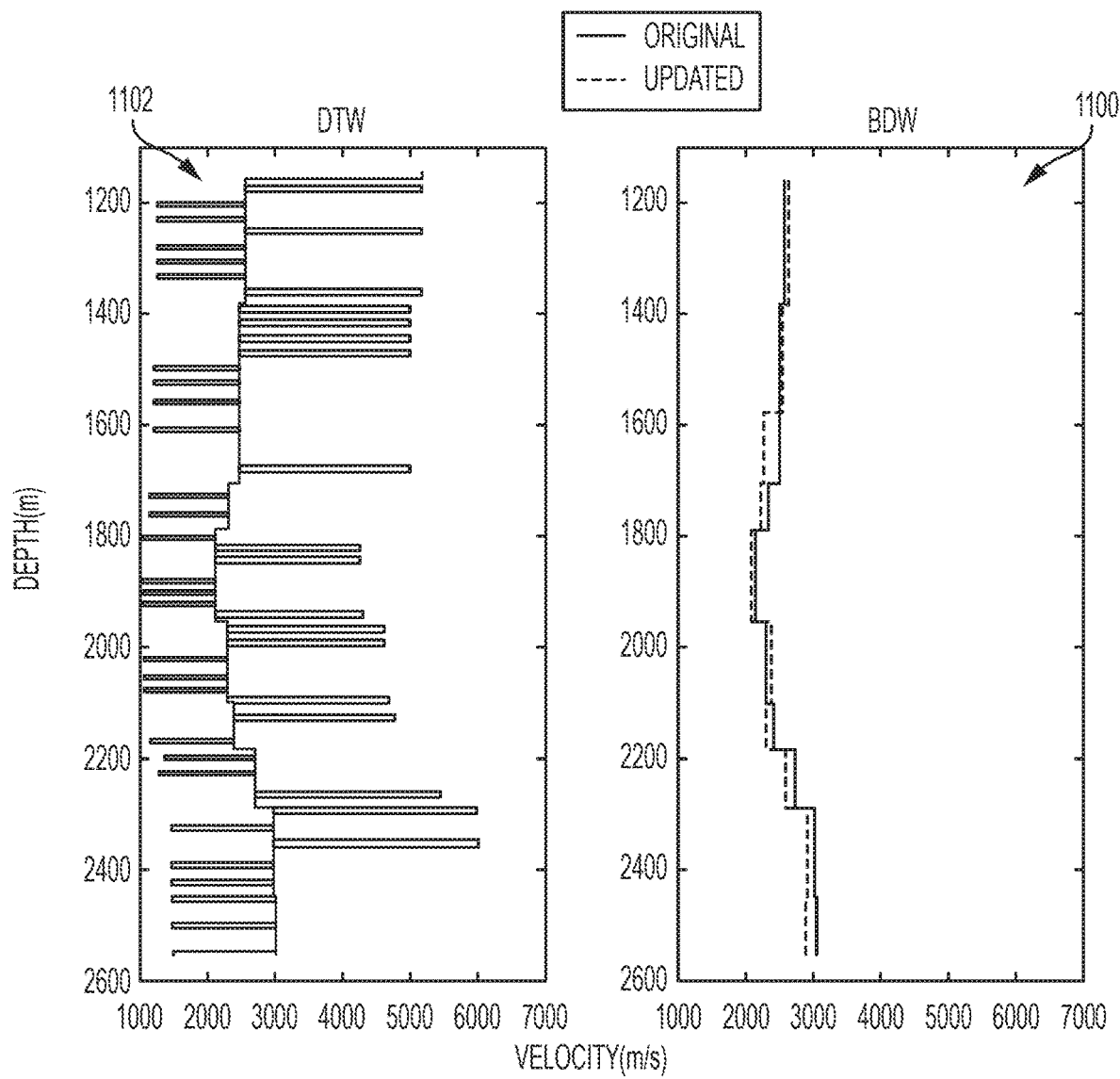
FIG. 11 is a graph of interval velocity curves converted from a time-depth relationship according to some aspects of the present disclosure.

FIG. 11 is a graph of interval velocity curves 1100 of the well log data converted from a time-depth relationship according to some aspects of the present disclosure. The interval velocity curves 1100 shows a velocity curve of the synthetic seismic trace prior to shifting overlaid with a velocity curve after a shift using the processing described in FIGS. 5-6. The interval velocity curves 1100 illustrate that the geological layers corresponding to the blocks of well log data 314 is preserved through the shifting. For comparison, interval velocity curves 1102 show the interval velocity curve prior to shifting overlaid with a velocity curve after a shift using an alternative method, dynamic time warping. As illustrated by the curves 1102, the geological layers are not preserved and the curve resulting from the shift includes a number of abnormalities.

Figure 12:
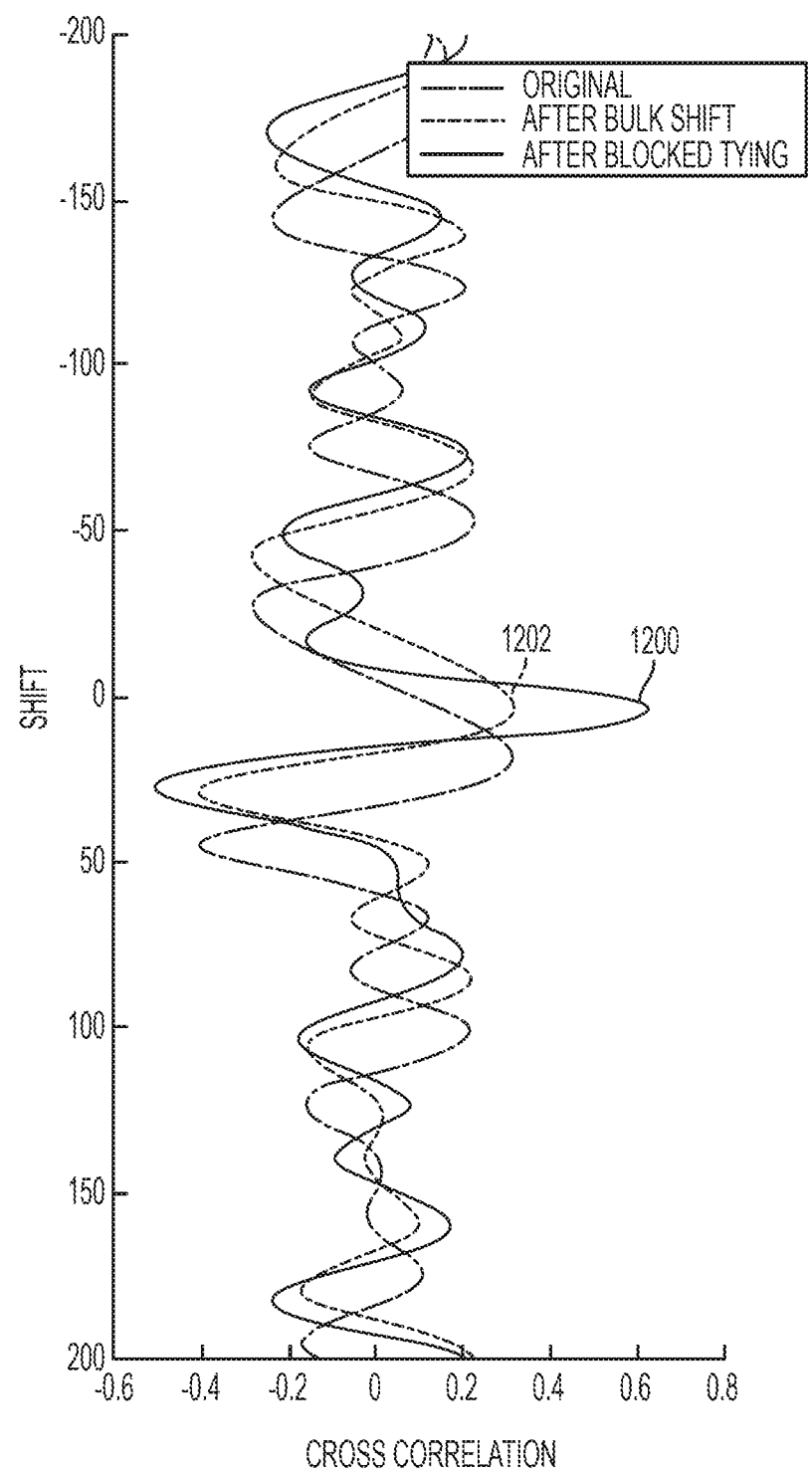
FIG. 12 is a graph of a cross-correlation between a seismic well tie and the seismic data according to an aspect of the present disclosure.

FIG. 12 is a graph of a cross-correlation between the seismic well tie 1000 of FIG. 10 generated using the processes described in FIGS. 5-6 and the seismic data 316 according to an aspect of the present disclosure. A curve 1200 illustrates that the seismic well tie generated using the processes of FIGS. 5-6 achieves a maximal cross-correlation at a zero shift compared to curve 1202 representing the cross-correlation between the seismic data 316 and seismic well tie 1012 of FIG. 10 generated using a bulk shifting process. The significant difference in value between the curves 1200, 1202 may indicate that the seismic well tie 1000 more closely aligns with the original seismic data 316 than the seismic well tie 1012 generated using bulk-shifting methods.

In some aspects, seismic well ties may be generated according to one or more of the following examples:

Example #1

A method may include receiving samples of data from well log data for an area of a subterranean formation. The method may also include receiving seismic data for the area of the subterranean formation. The method may also include receiving a constraint on changes to sample values for one or more blocks of the samples of data. The method may also include correlating the samples of data with the seismic data by shifting at least some of the samples of data and using the constraint on changes to the sample values to prevent the sample values for each block of the one or more blocks of the samples from changing beyond the constraint.

Example #2

The method of Example #1 may also include receiving a new constraint on changes to the sample values for at least one block of the one or more blocks. The method may also include correlating the samples of data with the seismic data by shifting at least some of the samples of data and using the new constraint on changes to the sample values to prevent the sample values for the at least one block from changing beyond the new constraint.

Example #3

The method of Examples #1-2 may feature the samples of data from well log data including sonic log samples and density log samples. The method may also feature correlating the samples of data with the seismic data to include generating a synthetic seismic trace by calculating a reflection coefficient using the sonic log samples and the density log samples for at least one block of the one or more blocks of the samples. Correlating the samples of data with the seismic data may also include shifting the synthetic seismic trace.

Example #4

The method of Examples #1-2 may feature correlating the samples of data to the seismic data to include identifying alignment errors between the samples of data and the seismic data by comparing each of the samples to a plurality of measurements of the seismic data to create an error matrix.

Example #5

The method of Example #1-4 may feature correlating the samples of data to the seismic data to include accumulating alignment errors between the samples of data and the seismic data corresponding to each of the one or more blocks of the samples.

Example #6

The method of Examples #1-5 may feature shifting at least some of the samples of data to include determining a shift path using a minimum accumulated alignment error corresponding to each of the one or more blocks of the samples as points in the shift path. Shifting at least some of the samples of data may also include using the shift path to shift a set of the samples of data to match the seismic data.

Example #7

The method of Examples #1-6 may feature the sample values including velocity values derived from the well log data. The method may also feature the constraint on changes to the sample values to include one of: (1) a constant velocity for each of the sample values within at least one block of the one or more blocks, (2) a linear change in velocity for each of the sample values within at least one block of the one or more blocks, or (3) a non-linear change in velocity for each of the sample values within at least one of the one or more blocks Example #8

The method of Examples #1-6 may feature the one or more blocks including a first block having the constraint on changes to the sample values within the first block and a second block having a different constraint on changes to the sample values within the second block.

Example #9

A computing device may include a processing device and a memory device in which instructions executable by the processing device are stored for causing the processing device to correlate samples of data from one or more blocks of well log data for an area of a subterranean formation with seismic data for the area of the subterranean formation by shifting at least some of the samples of data and using a constraint on changes to values of the samples to prevent the values from changing beyond the constraint.

Example #10

The computing device of Example #9 may feature the memory device including a blocking scheme associated with the well log data and defining boundaries of the one or more blocks of the well log data.

Example #11

The computing device of Examples #9-10 may feature at least one of the one or more blocks of the samples corresponding to one or more sets of the samples having the same lithology within a geological layer in the subterranean formation.

Example #12

The computing device of Examples #9-11 may feature the memory device further including instructions executable by the processing device for causing the processing device to identify alignment errors between the samples of data and the seismic data by comparing each of the samples to a plurality of measurements of the seismic data to create an error matrix.

Example #13

The computing device of Examples #9-12 may feature the memory device further including instructions executable by the processing device for causing the processing device to accumulate alignment errors between the samples of data and the seismic data corresponding to each of the one or more blocks of the well log data.

Example #14

The computing device of Examples #9-13 may feature the memory device further including instructions executable by the processing device for causing the processing device to determine a shift path using a minimum accumulated alignment error corresponding to each of the one or more blocks of the well log data as points in the shift path. The computing device of Examples #9-13 may feature the memory device further including instructions executable by the processing device for causing the processing device to use the shift path to shift a set of the samples of data to match the seismic data.

Example #15

The computing device of Examples #9-14 may feature the values of the samples including velocity values derived from the well log data. The constraint on changes to the values of the samples may include at least one of: (1) a constant velocity for each of the values of the samples within at least one block of the one or more blocks, (2) a linear change in velocity for each of the values of the samples within at least one block of the one or more blocks, or (3) a non-linear change in velocity for each of the values of the samples within at least one of the one or more blocks.

Example #16

The computing device of Examples #9-15 may feature the one or more blocks including a first block having the constraint on changes to the values of the samples within the first block and a second block having a different constraint on changes to the values of the samples within the second block.

Example #17

The computing device of Examples #9-16 may feature the one or more blocks including a first block having a first size and a second block having a second size that is greater than the first size.

Example #18

A system may include one or more well-logging tools positionable in a wellbore to generate well log data corresponding to an area of a subterranean formation adjacent to the wellbore. The system may also include a seismic tool positionable proximate to the subterranean formation to generate seismic data corresponding to the area of the subterranean formation. The system may also include a seismic source positionable at a surface of the wellbore to generate seismic waves detectable by one or more sensors of the seismic tool. The system may also include a computing device including a processing device for which instructions executable by the processing device are used to cause the processing device to correlate data samples from one or more blocks of the well log data with seismic data by shifting at least some of the data samples and using one or more constraints on changes to values of the data samples to prevent the values from changing beyond the constraint.

Example #19

The system of Example #18 may feature the computing device further including a memory device having instructions executable by the processing device for causing the processing device to identify alignment errors between the data samples and the seismic data by comparing each of the data samples to a plurality of measurements of the seismic data to create an error matrix. The memory device may also have instructions executable by the processing device for causing the processing device to accumulate the alignment errors for each block of the one or more blocks of the well log data to create an accumulation matrix having a column corresponding to each block. The memory device may also have instructions executable by the processing device for causing the processing device to determine a shift path using a minimum accumulated alignment error corresponding to each of the one or more blocks of the well log data as points in the shift path. The memory device may also have instructions executable by the processing device for causing the processing device to use the shift path to shift a set of the data samples to match the seismic data.

Example #20

The system of Examples #17-19 may feature the one or more constraints include at least one of: (1) a constant velocity for each of the values of the data samples within at least one block of the one or more blocks, (2) a linear change in velocity for each of the values of the data samples within at least one block of the one or more blocks, or (3) a non-linear change in velocity for each of the values of the data samples within at least one of the one or more blocks.

The foregoing description of the examples, including illustrated examples, has been presented only for the purpose of illustration and description and is not intended to be exhaustive or to limit the subject matter to the precise forms disclosed. Numerous modifications, adaptations, uses, and installations thereof can be apparent to those skilled in the art without departing from the scope of this disclosure. The illustrative examples described above are given to introduce the reader to the general subject matter discussed here and are not intended to limit the scope of the disclosed concepts.

What is claimed is:

1. A method, comprising:
   positioning one or more well-logging tools in a wellbore to generate well log data corresponding to an area of a subterranean formation adjacent to the wellbore;
   grouping, by a processing device, samples of data derived from the well log data into a plurality of blocks of samples, wherein each block of the plurality of blocks of samples includes respective sample values;
   receiving, by the processing device, seismic data for the area of the subterranean formation;
   receiving, by the processing device, a constraint on velocity changes applicable to the respective sample values associated with one or more blocks of the plurality of blocks of samples; and
   correlating, by the processing device, the samples of data with the seismic data by shifting at least some of the respective sample values associated with the one or more blocks subject to the constraint on velocity changes to prevent the respective sample values from changing beyond a limit imposed by the constraint.

2. The method of claim 1, further comprising:
   receiving another constraint on changes to the respective sample values associated with at least one block of the plurality of blocks of samples; and
   correlating the samples of data with the seismic data by shifting at least some of the respective sample values associated with the at least one block subject to the other constraint, to prevent the respective sample values for the at least one block from changing beyond another limit imposed by the other constraint.

3. The method of claim 1, wherein the samples of data include sonic log samples and density log samples,
   wherein correlating the samples of data with the seismic data includes:
      generating a synthetic seismic trace by calculating a reflection coefficient using the sonic log samples and the density log samples for at least one block of the plurality of blocks of samples; and
      shifting the synthetic seismic trace.

4. The method of claim 1, wherein correlating the samples of data to the seismic data includes identifying alignment errors between the samples of data and the seismic data by comparing each of the samples of data to a plurality of measurements of the seismic data to create an error matrix.

5. The method of claim 1, wherein correlating the samples of data to the seismic data includes accumulating alignment errors between the respective sample values and the seismic data corresponding to each block of the one or more block.

6. The method of claim 1, wherein shifting at least some of the respective sample values includes:
   determining a shift path using a minimum accumulated alignment error corresponding to each block of the one or more blocks as points in the shift path; and
   using the shift path to shift a set of the respective sample values to match the seismic data.

7. The method of claim 1, wherein the respective sample values include velocity values derived from the well log data, and wherein the constraint on velocity changes is configured to produce: (1) a constant velocity for each of the respective sample values within the one or more blocks, (2) a linear change in velocity for each of the respective sample values within the one or more blocks, or (3) a non-linear change in velocity for each of the respective sample values within the one or more blocks.

8. The method of claim 7, wherein the plurality of blocks of samples includes a first block having the constraint on velocity changes to the respective sample values within the first block, and wherein the plurality of blocks of samples includes a second block having a different constraint on changes to the respective sample values within the second block.

9. A system, comprising:
   a well-logging tool;
   a processing device; and
   a memory device in which instructions executable by the processing device are stored for causing the processing device to:
      receive, from the well-log tool, well log data corresponding to an area of a subterranean formation adjacent to a wellbore;
      group samples of data derived from well log data into a plurality of blocks of samples, wherein each block of the plurality of blocks of samples includes respective sample values;
      receive seismic data for the area of the subterranean formation;
      receive a constraint on velocity changes applicable to the respective sample values associated with one or more blocks of the plurality of blocks of samples; and
      generate a seismic well tie by correlating the samples of data with the seismic data, the samples of data being correlated with the seismic data by shifting at least some of the respective samples values associated with the one or more blocks subject to the constraint on velocity changes; and
      generate a graphical output for display on a display device indicating the seismic well tie for use by a well operator in determining properties of the subterranean formation at specific depths in the wellbore.

10. The system of claim 9, wherein the memory device includes a blocking scheme associated with the well log data and defining boundaries of the plurality of blocks of samples.

11. The system of claim 9, wherein samples of data are grouped into the plurality of blocks of samples based on a lithology within one or more geological layers in the subterranean formation.

12. The system of claim 9, wherein the memory device further comprises instructions that are executable by the processing device for causing the processing device to identify alignment errors between the samples of data and the seismic data by comparing each of the samples of data to a plurality of measurements of the seismic data to create an error matrix.

13. The system of claim 9, wherein the memory device further comprises instructions that are executable by the processing device for causing the processing device to accumulate alignment errors between the respective sample values and the seismic data corresponding to each block of the one or more blocks.

14. The system of claim 9, wherein the memory device further comprises instructions that are executable by the processing device for causing the processing device to:

determine a shift path using a minimum accumulated alignment error corresponding to each block of the one or more blocks as points in the shift path; and use the shift path to shift a set of the respective sample values to match the seismic data.

15. The system of claim 9, wherein the respective sample values include velocity values derived from the well log data, and wherein the constraint on velocity changes is configured to produce: (1) a constant velocity for each of the respective sample values within the one or more blocks, (2) a linear change in velocity for each of the respective sample values within the one or more blocks, or (3) a non-linear change in velocity for each of the respective sample values within the one or more blocks.

16. The system of claim 9, wherein the plurality of blocks of samples includes a first block having the constraint on velocity changes to the respective sample values within the first block, and wherein the plurality of blocks of samples includes second block having a different constraint on changes to the respective sample values within the second block.

17. The system of claim 9, wherein the plurality of blocks of samples includes a first block having a first size and a second block having a second size that is greater than the first size.

18. A system, comprising:
a seismic tool positionable proximate to a subterranean formation to generate seismic data corresponding to an area of the subterranean formation adjacent to a wellbore;
a seismic source positionable at a surface of the wellbore to generate seismic waves detectable by one or more sensors of the seismic tool; and
a computing device including a processing device and a memory device, the memory device including instructions that are executable by the processing device to cause the processing device to:
receive well log data corresponding to the area of the subterranean formation;
group samples of data derived from well log data into a plurality of blocks of samples, wherein each block of the plurality of blocks of samples includes respective sample values;
receive the seismic data;
receive a constraint on velocity changes applicable to the respective sample values associated with one or more blocks of the plurality of blocks of samples; and
correlate the samples of data with the seismic data by shifting at least some of the respective sample values associated with the one or more blocks subject to the constraint on velocity changes to prevent the respective sample values from changing beyond a limit imposed by the constraint.

19. The system of claim 18, wherein the memory device further includes instructions that are executable by the processing device for causing the processing device to:
identify alignment errors between the samples of data and the seismic data by comparing each of the samples of data to a plurality of measurements of the seismic data to create an error matrix;
accumulate the alignment errors for each block of the plurality of blocks of samples to create an accumulation matrix having a column corresponding to each block of the plurality of blocks of samples;
determine a shift path using a minimum accumulated alignment error corresponding to each block of the plurality of blocks of samples as points in the shift path; and
use the shift path to shift a set of the samples of data to match the seismic data.

20. The system of claim 19, wherein the constraint is configured to produce: (1) a constant velocity for each of the respective sample values within the one or more blocks, (2) a linear change in velocity for each of the respective sample values within the one or more blocks, or (3) a non-linear change in velocity for each of the respective sample values within the one or more blocks.

* * * * *

UNITED STATES PATENT AND TRADEMARK OFFICE
CERTIFICATE OF CORRECTION

PATENT NO. : 11,079,510 B2  
APPLICATION NO. : 16/063834  
DATED : August 3, 2021  
INVENTOR(S) : Wang et al.

Page 1 of 1

It is certified that error appears in the above-identified patent and that said Letters Patent is hereby corrected as shown below:

In the Claims

Claim 5, Column 17, Line 57, please replace "block" with -- blocks --

Signed and Sealed this  
Twenty-eighth Day of December, 2021

Drew Hirshfeld  
*Performing the Functions and Duties of the*  
*Under Secretary of Commerce for Intellectual Property and*  
*Director of the United States Patent and Trademark Office*